(No Model.) 3 Sheets—Sheet 3.
J. L. HASTINGS.
MANUFACTURE OF GAS.
No. 505,524. Patented Sept. 26, 1893.
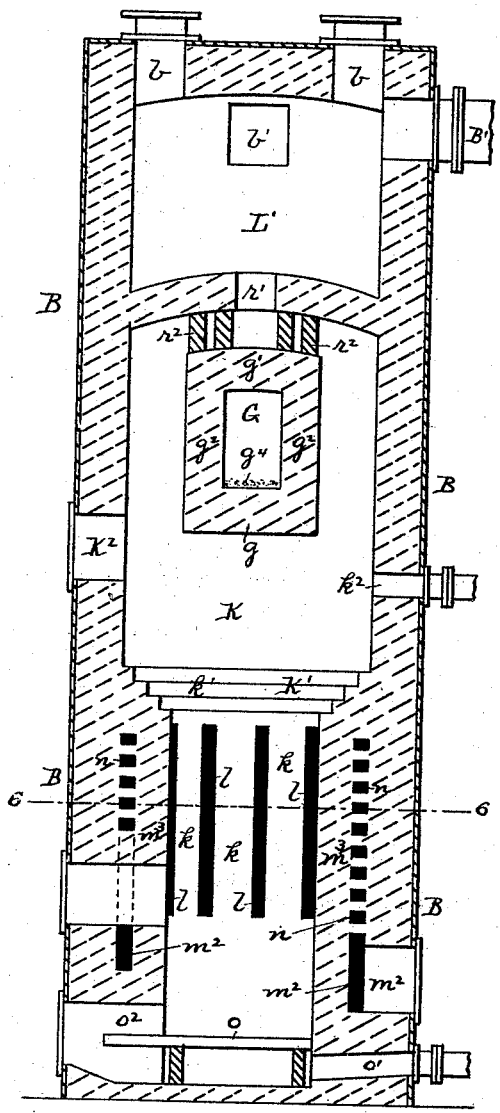
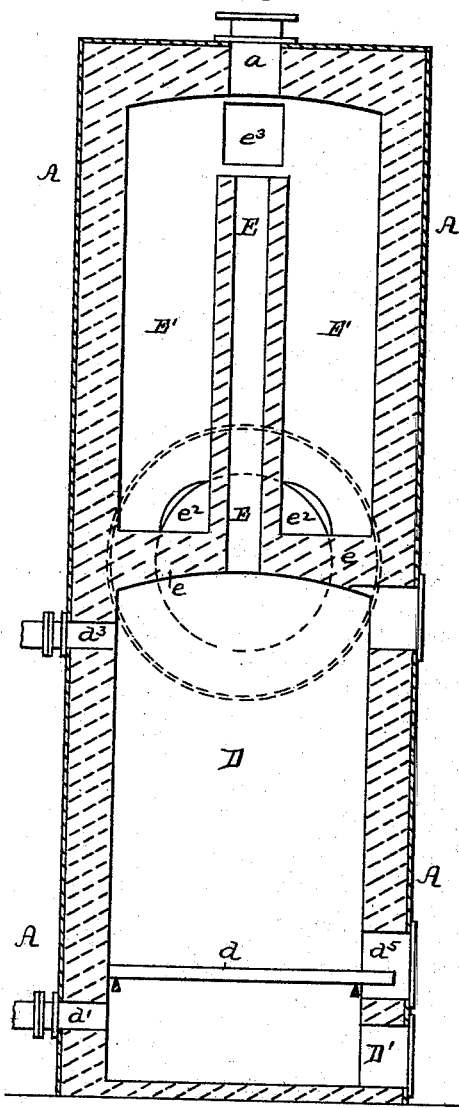
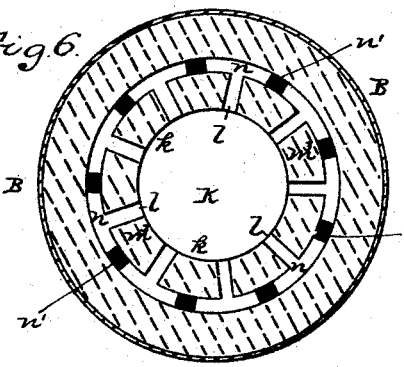
Witnesses:
J. N. Cooley.
Robt. D. Totten.
M. J. Hedges.
Inventor:
James L. Hastings
By Kay & Totten
Attorneys

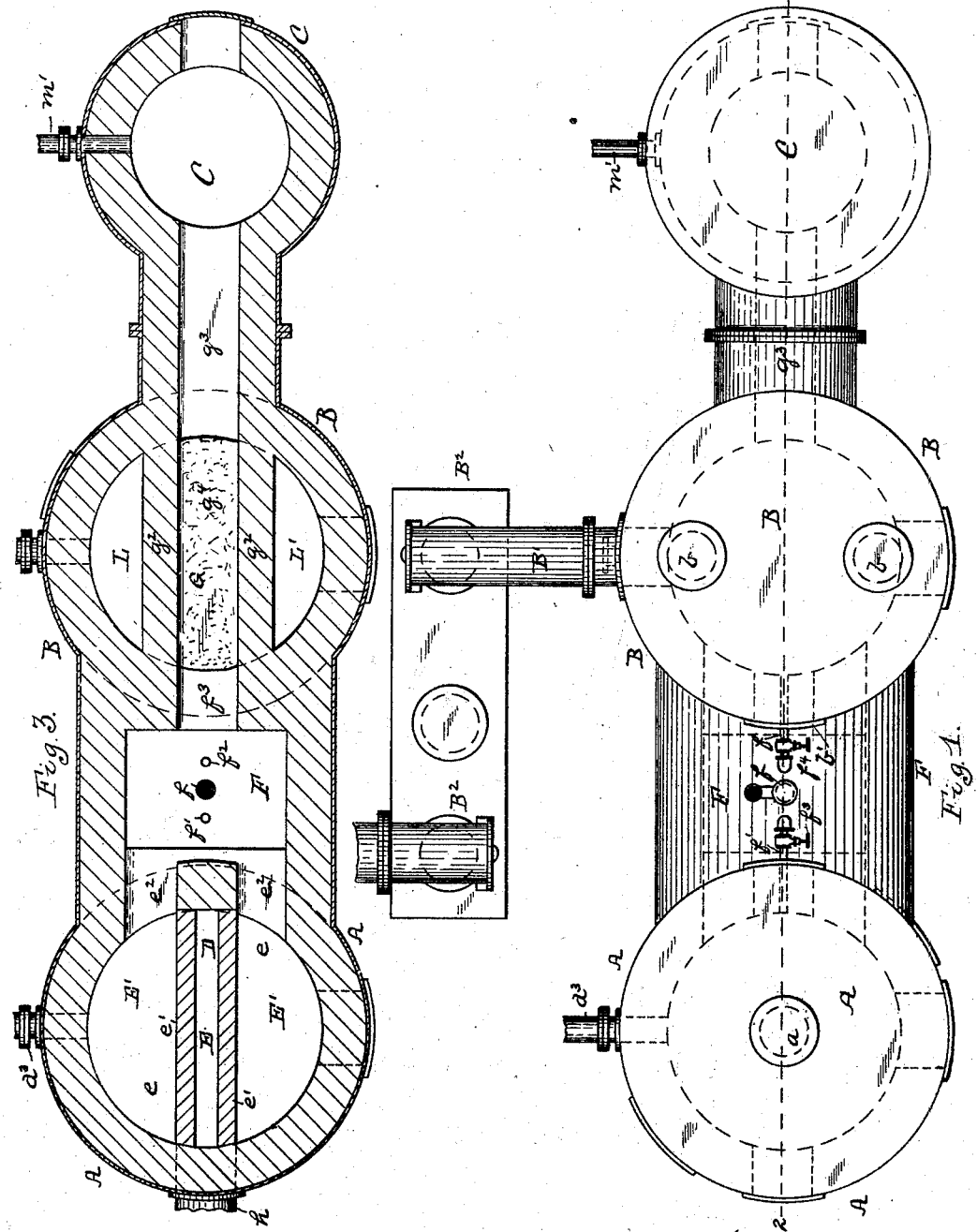

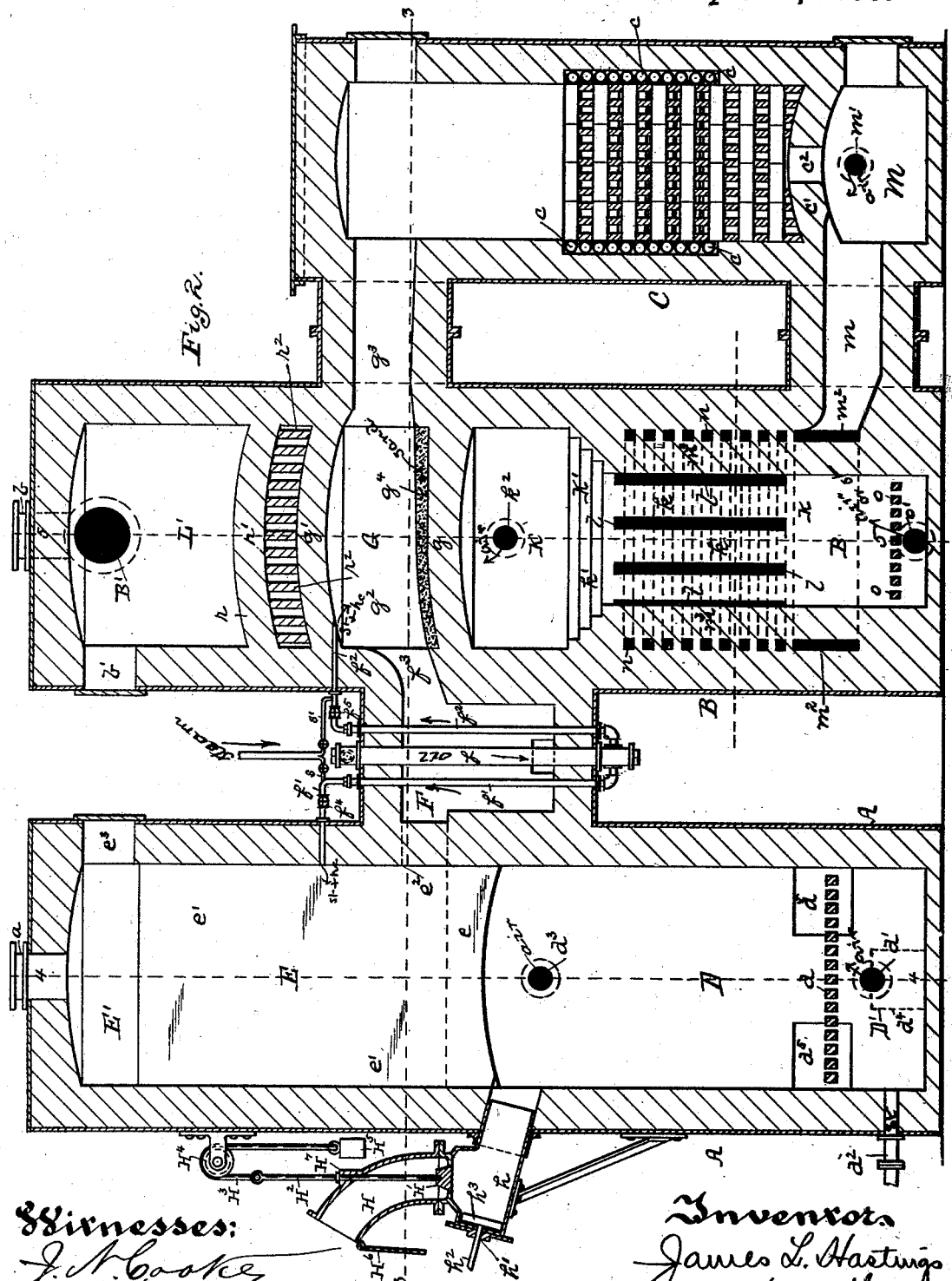

UNITED STATES PATENT OFFICE.

JAMES L. HASTINGS, OF PHILADELPHIA, PENNSYLVANIA, ASSIGNOR TO THE NATIONAL HEAT AND POWER COMPANY, OF SAME PLACE.

MANUFACTURE OF GAS.

SPECIFICATION forming part of Letters Patent No. 505,524, dated September 26, 1893.

Application filed January 11, 1892. Serial No. 417,668. (No model.)

*To all whom it may concern:*

Be it known that I, JAMES L. HASTINGS, a resident of Philadelphia, in the county of Philadelphia and State of Pennsylvania, have invented a new and useful Improvement in the Manufacture of Gas; and I do hereby declare the following to be a full, clear, and exact description thereof.

My invention relates to the manufacture of gas, being applicable to the manufacture of both illuminating gas and fuel gas; the method herein described being especially applicable to an intermittent gas process, though some of its steps may apply to a continuous process; and the apparatus herein described being capable of use both in an intermittent and a continuous process.

The general process may be described as follows, namely, passing air through a body of carbon, so forming producer gas, burning such gas and passing the products through open refractory material, and passing the same through a chamber containing pipes through which the hydrocarbon is fed to the gases, to heat the same, then burning the gases and passing the heated products thereof through a body of carbon to heat the same to redness, and, finally, burning any resultant gases to externally heat a chamber containing a bed of sand; then passing steam through the first body of carbon and introducing heated hydrocarbon and superheated steam into the resultant gas above the heated bed of sand, and then passing the resultant gas and vapor first through the body of heated refractory material and then through the body of red-hot carbon to fix the gas and cause the generation of hydrocarbon gases, and finally intermingling the gas under pressure in the mixing chamber before passing them to the wash box. It is also desired to cover certain steps of the process as will be set forth hereinafter in the claims.

The apparatus included within my invention has certain improvements which will be more particularly hereinafter described and claimed.

To enable others skilled in the art to practice the invention, I will describe the same more fully, referring to the accompanying drawings, in which—

Figure 1 is a plan view. Fig. 2 is a longitudinal central section on the line 2—2, Fig. 1. Fig. 3 is a cross section on the line 3—3, Fig. 2. Fig. 4 is a vertical cross section on the line 4—4, Fig. 2. Fig. 5 is a vertical cross section on the line 5—5, Fig. 2, and Fig. 6 is a horizontal cross section on the line 6—6, Fig. 5.

Like letters of reference indicate like parts in each of the views.

The gas making apparatus illustrated consists, generally stated, of three vertical structures connected together at suitable points, the first structure A being known as the first furnace, the second structure B being known as the second furnace, and the third structure C being known as the superheating chamber. In the first furnace A I form in the lower part thereof the cupola generator D, having near the base thereof the grate bars $d$, the air port $d'$, and the steam port $d^2$, while in the upper part of the said cupola generator D is the air port $d^3$. About midway of the furnace A, and at the upper end of the cupola generator D are the arches $e$ which extend across the furnace in one direction leaving between them a narrow vertical space, and from which arches the walls $e'$ rise, so forming the narrow vertical channel E which is of the full width of the furnace in one direction and extends up toward the top thereof, so forming on each side of the same and above the arches or cross walls $e$ the chambers E' which can, if desired, be filled with checker work or open refractory material so as to absorb and retain a large portion of heat. Leading from the bases of these heating chambers E' are the ports $e^2$ which open into the hydrocarbon heating chamber F placed between the first furnace A and the second furnace B, and from which the port $f^3$ forms an entrance into the muffle chamber G, extending across the second furnace B as hereinafter described. Suitable doors, giving access to the different parts of the first furnace A, may, of course, be employed, such as a door to the ash pit D' which is indicated by the dotted lines at $d^4$, doors on the line of the grate bars $d$ as at $d^5$ for removing clinker or like purposes, and a door $e^3$ at the upper end of the casing, giving access to the space above the channel E and the chambers E'. The furnace has also the relief valve $a$ at the upper end thereof, a part of which is shown.

For the purpose of feeding the coal to the cupola generator D, I prefer to employ the apparatus shown in Fig. 2, though any suitable feeding mechanism may, of course, be employed. The charging device shown communicates with the upper end of the cupola generator by an inclined chute $h$ at the outer end of which is a stuffing box $h'$ through which a piston rod $h^2$ passes carrying at the inner end thereof a plunger or piston $h^3$. Above the chute $h$ is the hopper H which has at the base thereof a valve seat in which is seated the conical valve H' which fits in its seat by upward movement, the valve H' being connected to a valve rod $H^2$ passing through a stuffing box $H^7$, and at the upper end of which rod a rope or chain $H^3$ passing over the pulley $H^4$ is connected, such rope having at one end the weight $H^5$. This charging apparatus is employed in the following way: The coal is fed into the hopper H, the weight $H^5$ holding the valve H' to its seat, so that there can be no escape of gas. The coal is fed to the hopper until it is filled, and the mouth of the hopper is provided with a door $H^6$ which is then swung over the mouth thereof and fastened by suitable clips so making it gas tight. By raising the weight $H^5$ the valve H' is then dropped permitting the coal to descend from the hopper into the chute $h$, the coal passing down through the inclined chute into the generator D; and any coal which lodges within the inclined chute is forced therefrom by the plunger $h^3$ so feeding all the coal from the chute into the generator. As soon as the coal has been emptied from the hopper, the weight $H^5$ draws the valve back to its seat and the operator can then open the door $H^6$ and refill the hopper, escape of gas during the charging operation being thus prevented.

Instead of the plunger $h^3$, steam or air pressure may be employed to discharge the coal from the chute, as described in application made by me of even date herewith, Serial No. 417,667.

For the purpose of heating the oils as they are fed to the apparatus, I employ the hydrocarbon heating chamber F, built within a horizontal casing extending between the first furnace A and the second furnace B, the chamber being rather larger than the ordinary flue or passage between said chambers, so as to obtain a greater exposure of the pipes, the chamber being built within a horizontal casing secured to the casings of the furnaces A, B, and being suitably lined with fire brick. Extending vertically through the heating chamber F and its casing and lining are the three pipes, $f, f', f^2$, the main pipe $f$ communicating with the main source of the oil supply and being controlled by a suitable valve so as to close off the supply entirely from said pipes, and said pipe extending centrally through the chamber and communicating below said chamber with the pipes $f', f^2$, which then extend up through the chamber, the pipe $f'$ opening into the channel E of the heating furnace A, while the pipe $f^2$ opens into the muffle chamber G of the heating furnace B, said pipes being controlled by suitable valves $f^4, f^5$. The pipes are inclosed in asbestus or other suitable fire-proof material to protect them from direct contact of flame. As said pipes are exposed to the heat of the chamber F and are therefore subject to considerable expansion and contraction, I have secured them at their upper ends, such as at the top of the casing of the chamber, and arranged for them to have a sliding connection with the base of the chamber through suitable packed passages to prevent the escape of gas, and as a result the pipes can expand or contract within said chamber, room thus being given for their expansion below the hydrocarbon chamber. Suitable steam pipes $s, s'$ leading from the superheating chamber communicate with the said pipes $f', f^2$, so providing for the injection of oil or oil vapor by means of superheated steam, or the injection of a combined body of oil or oil vapor and steam. It will be noticed that the central pipe $f$ is closed at both ends by plugs. This permits the opening of the central pipe so that it may be readily cleaned of any sediment or coating of heavy hydrocarbon. At the same time, the side pipes $f', f^2$, may be cleaned by blowing steam through the same and forcing any such substance first into the central pipe $f$ and then out at the opening at the base.

The heating furnace B contains the muffle chamber G above referred to, and below the same the fixing chamber K, while around and above the muffle chamber is the gas mixing chamber L, L'. The muffle chamber extends entirely through the heating furnace and has no communication therewith, being placed in this position in order to be properly heated up and maintained at an even heat by the heated gas or products passing through the muffle chamber, or around that chamber in their course to the relief valve or the pipe B' leading to the wash box. The chamber G is formed of the bottom arch wall $g$, the top arch wall $g'$, and the side walls $G^2$ between the same, and said chamber opens through the flue or passage $g^3$ into the superheating chamber C. In order to maintain a body of sand as at $g^4$ in said muffle chamber, the sides of it are raised so as to support said body of sand on the floor of the chamber G.

Following the course of the gases, I will next describe the superheating chamber C which is a long vertical chamber built within a suitable casing lined with fire brick, with the upper end of which the flue or passage $g^3$ communicates said chamber having located therein a coil or pipe $c$ which extends around the cylindrical walls thereof, and having near the base of the chamber an arch $c'$ with the central opening $c^2$ therein, forming a passage from the superheating chamber into the combustion chamber M at the base of the superheater. The space within the chamber C and not occupied by the coils of pipe is preferably filled with checker work or open refractory material as shown, and for some purposes, according to the use of the apparatus, it may be necessary to close in the steam superheating coil so as to protect it from direct contact with the flame to prevent it from burning out too rapidly. The said steam coil communicates with a suitable steam generator, and pipes lead therefrom to points where steam is introduced into the apparatus.

The combustion chamber M is provided with an air inlet $m'$, so that, in heating up, all gases passing from the muffle chamber and through the superheater may be burned in said combustion chamber, the air for supporting combustion being introduced through the pipe $m'$, and the highly heated products of combustion passing from the combustion chamber M through the conduit or flue $m$ connecting the base of the superheater C and the base of the second heating furnace B. The said products then pass around the base of the fixing chamber K, and then upwardly through such fixing chamber through the body of coke, or other suitable carbon contained therein, and then pass into the mixing chamber L, L' and escape through the relief valve $b$.

The particular construction of the fixing chamber K is clearly shown in the three views, Figs. 2, 5 and 6. The lower part thereof is built up as a circular wall within the furnace lining rising a short distance from the top of the conduit or flue $m$, which conduit or flue communicates with the annular chamber $m^2$ extending entirely around the annular base of the fixing chamber, so that the coke in this portion of the fixing chamber is heated by conduction through the annular wall $m^3$. Extending up from such annular wall and forming continuations of the same are the pillars $k$ which extend to what might be termed the annular stepped or flaring portion $k'$ of the fixing chamber, which opens the chamber out to the full diameter of the heating furnace, forming the upper portion K' of said fixing chamber, into which portion coke or other suitable carbon is fed through the door $K^2$.

Between the pillars $k$ are the vertical spaces $l$ forming communication between the interior of the fixing chamber and the series of annular passages $n$ extending around the same and communicating with each other by the ports $n'$, the lowest one of said annular passages communicating by like ports with the annular chamber $m^2$ above referred to. By such construction the highly heated products of combustion pass from the conduit $m$ into the annular chamber $m^2$ heating the lower portion of the fixing chamber, and then rise through the ports $n'$ and circulate in the annular spaces $n$ and pass thence through the vertical passages $l$ into and through the coke or other carbon in the fixing chamber, acting to raise the same to the desired heat by direct contact therewith, and as the upper portion of said fixing chamber flares out to the full width of the furnace, as at $k'$, these heated products are compelled to pass through the mass of coke in the upper part of the fixing chamber. Air or steam may be admitted below the grate bars $o$ through the pipe $o'$, and ashes, &c., removed through the door $o^2$.

It will be evident that some of the carbonic acid gas formed by combustion in the chamber M will, in passing through the coke, become recarburized and therefore suitable for heating purposes, and as it is desirable to maintain the muffle chamber G with its sand bed $g^4$ at a comparatively high temperature, I admit further portions of air through the air passage $k^2$ which burns with said carbonic oxide and acts to heat the walls of the muffle chamber as well as of the chambers L, L'.

In order to cause the heated gases and products to pass entirely around the muffle chamber and maintain the same at a high even heat, I throw from the sides of the furnace the arch $r$ which has a central port $r'$ and is supported on the muffle chamber G by a series of pillars or open work, as at $r^2$, so dividing the mixing chamber into two parts L, L'. The said furnace B is provided with relief valve or valves $b$ to give free discharge therefrom, and with the eduction pipe B' leading to the wash box B$^2$, and it may also have a door $b'$ for entrance to the upper portion thereof for repair, &c. It will be noticed that the eduction pipe has no valve, its end entering through a water seal to the hydraulic main, so that when the relief valve is open no gases pass through said pipe, but when the said valve is closed, the gases are forced through said pipe and the water seal to the scrubbing apparatus and tank.

As so constructed, the operation of making gas is carried on in the following way, in practicing the intermittent process forming the subject matter of the present application: The fire is started on the grates of the generator D and the fixing chamber K, the relief valves $a, b$, respectively, being opened. Suitable carbon is fed to these chambers, it being preferred to employ bituminous coal or small anthracite coal in the generator D, and coke or large anthracite coal in the fixing chamber K. The coal is fed to these chambers through the feeding apparatus $h$, H, or by other suitable means, and after the carbon is all ignited I prefer to employ an air blast, air being fed through the pipe $d'$ to the generator D and through the pipe $o'$ to the fixing chamber, and the mass of coal being gradually heated up, air being fed at the upper end of the generator D through the pipe or opening $d^3$ so as to burn any gases rising from the coal in the generator within the channel E, and air being fed through the pipe or passage $k^2$ to the upper end of the fixing chamber so as to burn the same around the muffle chamber G and in the mixing chamber L, L'. This is continued until the coal is all ignited, when the relief valve $a$ is closed and part of the gases formed in the generator D is burned so that their heated products pass upwardly through the channel E and thence through the chambers E' heating said chambers (and the checker work therein, if such checker work is employed), and passing thence through the oil heating chamber F and heating the pipes extending through said chamber and any oil contained therein, the gas and heated products passing thence through the muffle chamber G to the superheater C, and down through checker work in the same into the combustion chamber M, and so acting to superheat the steam in the coil $c$. After the apparatus is well heated, the air supply through the pipe $d^3$ may be cut off so that the gases formed in the generator D act to heat these parts and the air supply at the base of the fixing chamber may also be cut off; while the gases passing into the combustion chamber M are burned therein, air being fed to the same through the pipe $m'$, the heated products and flame passing through the conduit or passage $m$ around the base of the fixing chamber K, and thence up into the annular spaces $n$ through the ports $n'$ and through the vertical passages $l$, so as to pass directly into and through the coke or other carbon in said chamber and heat the same without consuming the coke, as no air for the combustion of the same is supplied. The result is that the coke in the fixing chamber is raised to a red heat, a cherry red being preferred for the purpose, and it being important that the coke shall not be raised to too high a heat as it is not desirable to have it brought to a high incandescence. In passing through the coke the carbonic acid of the products of combustion may absorb a further portion of carbon, and the gas so formed is burned in the upper part of this chamber below the muffle chamber and the sand bed therein, and also to heat the mixing chamber L, L', the products being permitted to escape through the relief valves $b$. The apparatus is thus brought to the proper temperature for gas making, it being desirable that too high a heat shall not be obtained either in the checker work in the chambers E' or C or in the coke in the fixing chamber, said coke being only raised to a red heat, as above stated. The air is then turned off from the pipe $d'$, the pipe $m'$ and pipe $k^2$, and the relief valve or valves $b$ closed. Steam is then admitted at the base of the generator D, and in passing through the incandescent carbon therein is broken up into hydrogen and carbonic oxide, or water gas, which passes up through the channel E, and as it passes through the same the oil or oil vapor from the pipe $f'$, together with superheated steam, is sprayed into said channel, which, on account of its length, gives full opportunity for the vaporization thereof, the oil being vaporized by the heat of the gas rising through the channel as well as by the heat radiated from the channel walls. The chilling or cooling effect of such hydrocarbon upon the gases is, to a large extent, overcome by the previous heating of the same in the pipes $f, f'$, in the oil chamber F. The commingled water gas, and hydrocarbon gas or vapor, and steam then pass over from said vertical channel E and down through the heated checker work in the chambers E', the larger portion of the hydrocarbon gases being converted into fixed gas in the checker work contained within said chambers. The gas and vapors then pass through the oil chamber F and into the muffle chamber G, and a further portion of heated oil and superheated steam is sprayed into the gas from the pipe $f^2$, the oil being heated in the manner above described, and this oil is quickly vaporized having a long horizontal course to travel through the muffle chamber, which is maintained at comparatively high heat, as well as through the passage $g^3$ over into the upper part of the superheater C. In case the heavier portions of hydrocarbon are not vaporized, they will fall upon the sand bed $p$ in said muffle chamber which is held at a high heat, and, instead of permitting the heavy hydrocarbon to cake on its surface, provides a highly heated porous surface by contact with which these heavy hydrocarbons are quickly vaporized, so that practically all the hydrocarbons are used in gas making. The gases then pass down through the superheater, a portion of them being fixed within the heated checker work contained therein, but as that checker work is not held at a very high heat, part of the vapors, and the steam which has not yet been broken up, pass down into the combustion chamber and then over around the fixing chamber and then through the annular spaces surrounding the same and through the vertical spaces $l$, and so the gas and the oil vapors and steam are forced through the red-hot coke in the fixing chamber, the steam being here decomposed and forming nascent hydrogen and carbonic oxide, which in the presence of the hydrocarbon vapors causes the reaction of the carbonic oxide and hydrocarbons upon each other under the cover of red-hot coke, leading to the formation of illuminants or heavy hydrocarbons, a large portion of such illuminants and of marsh gas being obtained by the process; and, at the same time, any carbonic acid present is converted into carbonic oxide. As the gases pass through the coke bed they absorb the necessary latent heat to render them fixed or stable, a fixed illuminating and heating gas of high quality being thus obtained. By the employment of the coke at a red heat, as compared with the ordinary white heat or heat approaching whiteness, which has been considered necessary for fixing gas, I am enabled to fix these gases without the formation or depositing of any solid carbon or soot, all of the hydrocarbons being thus utilized for enriching the gas instead of being broken up into hydrogen or lighter hydrocarbons and depositing out of them the lamp black or like solid matter, while in the same body the heavy hydrocarbons are generated, and the carbonic acid reconverted, this being a very important part of the process. After the formation and fixing of the gases they then rise around the muffle chamber G and pass through the mixing chambers L, L', and in these chambers a very large portion of the heat of the gases is absorbed in maintaining the muffle chamber at a high and fixed heat, while, as it requires considerable pressure to force the gas out of the eduction pipe and through the water seal in the hyraulic main, the gases are permitted to mix thoroughly within said chamber and to reach an even temperature throughout under such considerable pressure, which causes a thorough intermingling and even composition of the gases, and prevents stratification of the same within the holder. At the same time, by the employment of such mixing chamber, a large portion of heat is absorbed from the gases and the difficulty experienced in cooling the gases immediately after fixing is, to a great extent, done away with. This process is continued until the coal in the generator loses its temperature so that it will not cause the decomposition of the steam, when the supply of steam and oil is cut off from the apparatus and air again fed to the generator, and the producer gas so generated carried in the course above described to heat up the apparatus, air being admitted at the top of the generator through the pipe $d^3$, if necessary, and air being admitted through the pipe $m'$, so as to cause combustion of the gases in the combustion chamber M and the passage of the highly heated products through the conduit $m$ around and through the coke in the fixing chamber, and so reheating the coke by direct passage of the highly heated products of combustion through the same and raising it to the necessary red heat without causing the combustion of the coke. The products of combustion and any gases formed then pass upwardly through the chambers L, L', the gases being burned, if necessary, by the admission of air through the pipe $k^2$, and the products escaping through the relief valve $b$, and this being continued until the apparatus is brought to the proper heat, when the air supply is cut off, the relief valve $b$ closed, the valve in the eduction pipe E' opened, and the gas making operation repeated. During all these operations the steam is maintained at the necessary heat by the passage of the gases and heated products through the superheating chamber so that in the making of the gas the superheating steam and superheated or vaporized oil is employed, and a large part of the chilling and cooling action of the same upon the gases and the apparatus is prevented. The resultant gas is found to be high both in illuminating and heating properties, its illuminating properties, of course, depending upon the amount of heavy hydrocarbon gas or illuminants formed, according as the process is operated.

When the apparatus is employed for making fuel gas, or, as it might otherwise be stated, is operated as a continuous process, such process forming the subject matter of said separate application of even date herewith, Serial No. 417,667, after the heating up of the apparatus, sufficient air is fed through the pipe $o'$ continuously to the body of coke in the fixing chamber to maintain said body at about a red heat during the passage of the gases through the same. Air is also fed continuously to the generator D, and the producer gas formed rises upwardly through said chamber and through the channel E, passing thence through the mass of checker work in the chambers E' and thence through the oil heating chamber F and muffle chamber G, and, if it is desirable to add hydrocarbons to said gases the hydrocarbons are fed to the same in the channel E or muffle chamber G, or both, and the combined gases and hydrocarbon vapor and steam pass down through the superheater C and thence through the chamber $m$, the conduit $m$, and through the mass of coke in the fixing chamber K in which said gases are fixed, the gases passing thence upwardly into the mixing chamber L, L', and escaping through the eduction pipe B'. During such operation, if the coal in the generator D becomes too highly heated, steam may be admitted to said generator, or, if preferred, both steam and air may be admitted at the base of the same, so that the regular heat suitable for decomposing such portion of steam and forming producer gas in addition thereto is maintained in such chamber D. If desired, other gas generators may also be located between the heating furnace A and the heating furnace B, as shown in said application of even date herewith.

The process above described has special advantages in giving a large proportion of illuminants of heavy hydrocarbon gases in proportion to the amount of one or liquid hydrocarbon employed, and in forming a gas entirely free from carbonic acid, while it has but a small proportion of carbonic oxide, and is of such light specific gravity as to be easily transported through the pipes or conduits for city distribution. It has been found to have fine heating as well as fine illuminating qualities.

What I claim as my invention, and desire to secure by Letters Patent, is—

1. The herein described process of making gas, consisting in burning suitable gas and passing the heated products of complete combustion thereof through a body of carbon and thereby heating the same to (but not beyond) redness, and subsequently passing gas containing hydrocarbons through said red-hot carbon, substantially as and for the purposes set forth.

2. The herein described process of making gas, consisting in passing air through a body of carbon and the resultant gas through a chamber around pipes containing liquid hydrocarbon, thence through a chamber above a bed of sand, and thence through a steam superheated containing open refractory material, then burning the resultant gas and passing the products thereof around and through a body of carbon to heat the same to redness, and finally burning any resultant gases within a mixing chamber and around such chamber containing the bed of sand; and then passing steam through the first body of carbon, introducing heated hydrocarbon and superheated steam into the resultant gases above the heated bed of sand, and then passing the gases and vapors through such body of heated open refractory material and through such body of red-hot carbon, and finally intermingling the resultant gases under pressure in the heated mixing chamber before passing them to the wash box, substantially as and for the purposes set forth.

3. In apparatus for the manufacture of gas, a heating furnace having at the base thereof a cupola generator and having above the same a central vertical channel extending in one direction for the full width of the furnace, and having formed on the sides thereof chambers communicating with said channel at the top thereof, substantially as set forth.

4. In apparatus for making gas, a heating furnace having a cupola generator at the base thereof, and having above the same a central vertical channel extending in one direction for the full width of the furnace, and having chambers on each side thereof, said channel communicating at the base with the generator and at the top with said chambers, and said chambers having ports leading from the base thereof, substantially as set forth.

5. An apparatus for making gas having two vertical casings containing gas generating and fixing chambers, and a horizontal casing connecting and forming the passage way between the two casings, said passage forming an oil heating chamber and vertical oil heating pipes extending through the chamber and communicating with one of the casings, substantially as and for the purposes set forth.

6. An apparatus for making gas having two vertical casings containing gas generating and fixing chambers, and a horizontal casing connecting and forming the passage way between the two casings, the passage way between the casings being of greater area in vertical section than the inlet and outlet ports thereto, and so forming an oil heating chamber, and vertical oil heating pipes extending through the chamber and communicating with one of the casings, substantially as and for the purposes set forth.

7. An apparatus for making gas having an oil heating chamber provided with vertical oil heating pipes extending through the same, and having inlet and outlet ports through which the gas enters and passes from such chamber, the oil supply pipe communicating with the upper end of the pipe $f$ and said pipe communicating with the pipe $f'$ below and outside of said chamber, and said pipe $f'$ then passing through said chamber and above the same opening into the chamber into which the oil is to be introduced, substantially as set forth.

8. An apparatus for making gas having an oil heating chamber provided with vertical oil heating pipes extending through the same, and having inlet and outlet ports through which the gas enters and passes from such chamber, the oil supply pipe $f$ being closed at its upper and lower ends with plugs and the pipe $f'$ communicating therewith below the casing, and thence extending through the chamber to a point at which the oil is introduced into the apparatus, substantially as and for the purposes set forth.

9. An apparatus for making gas having the heating furnace B, a fixing chamber K at the base thereof, a muffle chamber G extending horizontally across the same and having no communication therewith within the furnace, a passage way outside of the furnace leading from the muffle chamber to the fixing chamber, an air entrance below said muffle chamber, and a mixing chamber above the fixing chamber and around and above the muffle chamber, substantially as and for the purposes set forth.

10. An apparatus for the manufacture of gas, having the fixing chamber K provided with a solid annular wall $m^2$ at the base thereof, the pillars $k$ rising therefrom and having the spaces $l$ between them, the annular spaces $m^2$ surrounding the base of the fixing chamber, the annular spaces $n$ surrounding the upper part thereof, said spaces communicating with each other through the ports or openings $n'$ and with the fixing chamber through the passages $l$, substantially as and for the purposes set forth.

11. An apparatus for the manufacture of gas, having the fixing chamber K provided with a series of pillars $k$ and having the spaces $l$ between them, an annular space or spaces surrounding the said pillars, said space communicating with the fixing chamber through the passages $l$ and said vertical pillars terminating in an annular flaring wall $k'$ opening out to the full width of said fixing chamber, substantially as and for the purposes set forth.

12. In an apparatus for the manufacture of gas, the combination of a cupola generator, a heating furnace provided with a muffle chamber extending transversely through the same, and having a fixing chamber below the muffle chamber, said cupola generator and muffle chamber being connected by a passage, and a steam superheater having a coil of superheating pipes, the exit end of said muffle chamber communicating with the upper end of the superheater, and the lower end of the superheater communicating with the fixing chamber in said heating furnace, substantially as and for the purposes set forth.

13. An apparatus for making gas having the heating furnace B provided with the fixing chamber K at the base thereof, and having the muffle chamber extending through but not communicating therewith, said heating furnace having arches extending over above the muffle chamber and having a central passage between them above the muffle chamber, and a chamber L' above said arches, substantially as and for the purposes set forth.

In testimony whereof I, the said JAMES L. HASTINGS, have hereunto set my hand.

JAMES L. HASTINGS.

Witnesses:
J. N. COOKE,
ROBT. D. TOTTEN.